Oct. 8, 1968  J. B. ORLANDO  3,405,226
TERMINAL BOX CONSTRUCTION
Filed Nov. 25, 1966
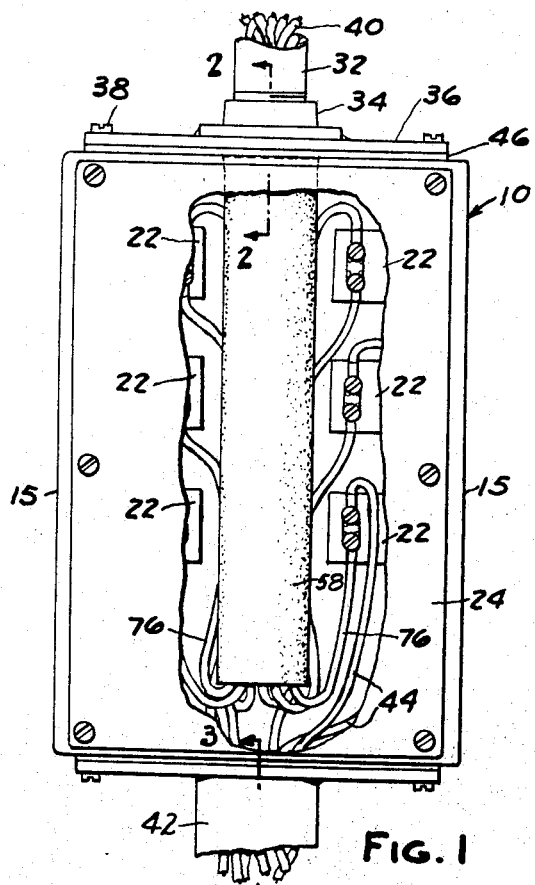
FIG. 1
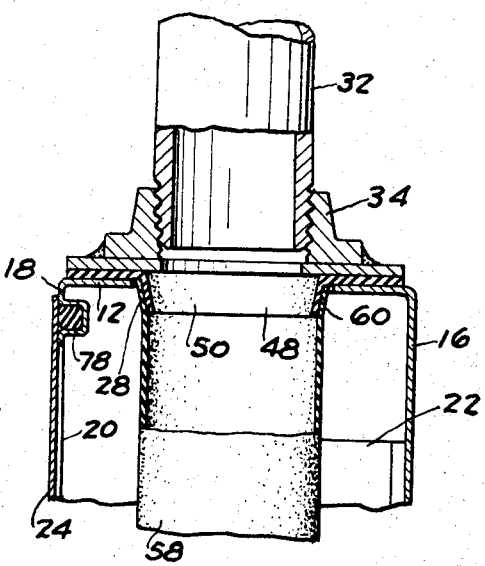
FIG. 2
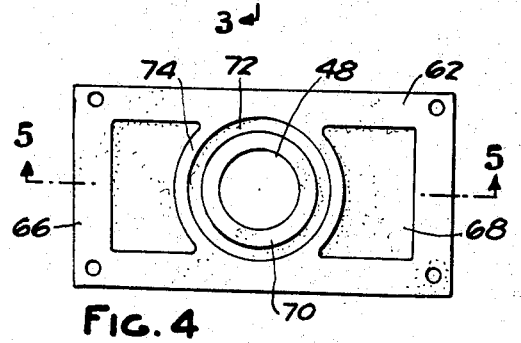
FIG. 4
FIG. 5
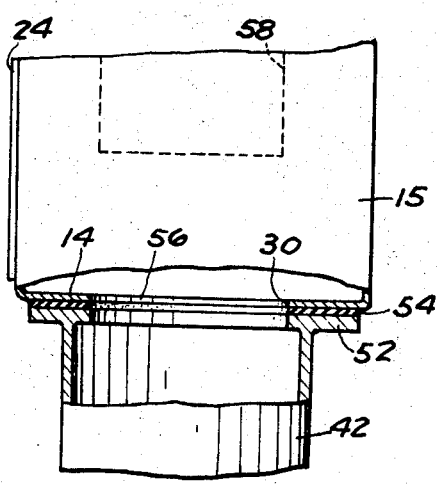
FIG. 3
INVENTOR.
JOHN B. ORLANDO
BY
Barnes, Kisselle, Raisch & Choate
ATTORNEYS

United States Patent Office 3,405,226
Patented Oct. 8, 1968

3,405,226
TERMINAL BOX CONSTRUCTION
John B. Orlando, St. Clair Shores, Mich., assignor to
F. Jos. Lamb Company, Incorporated, Detroit, Mich.,
a corporation of Michigan
Filed Nov. 25, 1966, Ser. No. 596,838
11 Claims. (Cl. 174—60)

ABSTRACT OF THE DISCLOSURE

A terminal box having electrical terminals and a rubber sleeve extending from a lead-in conduit into the box. The sleeve terminates below the level of the terminals so that water entering the box through the conduit will not reach the terminals.

---

This invention relates to terminal boxes of the type employed on machine tools and more particularly to a boot device usable with a terminal box for preventing water or condensation from reaching the electrical terminals in the box.

Most machine tools include a terminal box in which electrical wires extending from motors, solenoid switches, etc. on the machine tool are connected with terminals in the box to other wires such as from a control panel. Such terminal boxes are usually mounted on a fixed part of the machine tool with the wires from the control panel being directed overhead and downwardly into the terminal box through an aperture in the top wall thereof. The wires extending from the terminal box to the various motors, switches, etc. on the machine tool normally are directed out of the terminal box through an aperture in the bottom wall thereof. The terminals within the box are insulated from one another such as by mounting on blocks formed of insulating material. One of the problems which frequently arises in connection with such terminal boxes is the collection of water and/or coolant splashed from the machine tool in the overhead wire conduits which gravitates downwardly into the terminal box and along the wires and sometimes comes in contact with the terminals to produce short circuits, etc.

The primary object of the present invention is to provide a terminal box construction which prevents condensate, water, coolant, etc. which reaches the terminal box and which gravitates along the wires from reaching the electrical terminals within the box.

Other specific objects and features of the present invention will become apparent from the following description and drawings in which:

FIGURE 1 is a front elevational view, partly broken away, of a terminal box according to the present invention.

FIGURE 2 is a sectional view along the line 2—2 in FIG. 1.

FIGURE 3 is a sectional view along the line 3—3 in FIG. 1.

FIGURE 4 is a plan view of the gasket and boot member employed according to the present invention.

FIGURE 5 is a sectional view along the line 5—5 in FIG. 4 and showing one form of gasket and boot device.

In FIGS. 1 through 3 a conventional terminal box 10 is illustrated having a top wall 12, a bottom wall 14, two side walls 15, a rear wall 16 and a front wall 18. Front wall 18 is fashioned with a rectangular aperture 20 therein to permit access to the terminal blocks 22 mounted on the back wall 16 of the box. Aperture 20 is adapted to be closed by a cover plate 24 mounted on the box by screws. The top wall 12 has a central aperture 28 formed therein and the bottom wall 14 also has a central aperture 30 formed therein. A conduit 32 for wires extends from a remote point such as a control panel and is attached to the box 10 by a threaded flange 34. Flange 34 is welded or otherwise suitably secured to a top plate 36 which is mounted on the box by four screws 38. A plurality of wires 40 extends from a remote point such as a control panel through conduit 32 and downwardly into box 10 through aperture 28. At its lower end box 10 is suitably connected to a support member 42 in the form of a conduit and the wires 44 from within box 10 extend downwardly through the central aperture 30 in the bottom wall 14 of the box and through support conduit 42.

Between top plate 36 and top wall 12 there is arranged a rubber gasket 46. Gasket 46 has a central aperture 48 which registers with the apertures 28 in top wall 12, the aperture 48 being defined by a depending annular flange 50. The support conduit 42 has a support flange 52 and between the support flange 52 and the bottom wall 14 of the box there is arranged a second gasket 54 having a central aperture 56 which registers with aperture 30 in bottom wall 14.

In the arrangement shown in FIGS. 1 through 3 there is arranged within box 10 a rubber boot or sleeve 58. Boot 58 has its upper end telescoped over and bonded or cemented to the annular flange 50 on gasket 46 as at 60. Boot 58 extends downwardly from annular flange 50 to adjacent the bottom wall 14 of box 10. The lower end of boot 58 is spaced below the level of the lowest terminal block 22 in the box.

FIGS. 4 and 5 show an arrangement wherein the gasket for the top wall and the wire boot are molded as an integral unit. In this arrangement the gasket portion is designated 62 and the boot portion is designated 64. Boot portion 64 forms a sleeve-like extension around the central aperture 48. In other respects gasket portion 62 is identical in construction to gasket 46. The gasket portion 62 has a peripheral rib 66 which surrounds relieved areas 68 of thinner section. An annular rib 70 surrounds central aperture 48. Around the rib 70 gasket portion 62 is formed with an annular relieved area 72 which is separated from the relieved areas 68 by arcuate ribs 74. The gasket and boot are preferably formed of rubber.

With the terminal box sealed as described above and provided with the depending boot 58, it will be observed that the wires 40 which enter the box through the aperture 28 in the upper end thereof must extend downwardly out through the bottom of boot 58 and then upwardly to the terminal blocks 22. As long as the lower end of boot 58 extends below the level of the lowest terminal block in the box, it follows that each of the wires 40 extend upwardly from the lower end of boot 58 to its associated terminal block. The wires 44 extend from the terminal blocks 22 in a downwardly direction through the central aperture 30 in the bottom wall 14 and then downwardly through the support conduit 42. From this arrangement it will be apparent that any condensate that might collect on wires 40 or 44 or any water or coolant reaching the terminal box through conduit 32 is prevented from reaching the terminal blocks 22. Any liquid that might collect on wires 40 within conduit 32 flows downwardly along the wires 40 and collects at the U-bends 76 where the wires 40 emerge at the lower end of the boot 58. Any liquid that collects on wires 44 simply drops downwardly from the lower end of boot 58 and the U-bends 76 and into the support conduit 42. Thus, the condensate on the wires is effectively prevented from ever reaching the terminals. The gaskets 46, 54 likewise prevent any water or coolant splashed against the terminal box from entering the terminal box. A suitable gasket 78 is provided between the cover plate 24 and the front wall 18 of the box so that the terminal box as a whole is effectively sealed from ingress of water or moisture.

I claim:
1. An electrical terminal box having an opening adjacent the upper end thereof through which electrical conductors are adapted to extend downwardly into said box, said box having a plurality of electrical terminals therein located at a level spaced above the bottom of the box, a boot within said box extending downwardly from said opening and having a lower open end terminating at a level above the bottom of the box but below the level of said terminals whereby the electrical conductors entering said box through said opening may be directed downwardly through said boot and then upwardly around the lower end of the boot to the terminals so that any condensate collecting on said conductors or any liquid entering said box through said opening will gravitate to a level adjacent the lower end of the boot.

2. The terminal box called for in claim 1 wherein said boot is sealed to said box around the edge of said opening.

3. The terminal box as called for in claim 1 having a top wall, said opening being formed in said top wall.

4. The terminal box as called for in claim 3 including a conduit mounting fitting on said top wall having a passageway therein registering with said opening and a gasket interposed between said conduit fitting and said top wall.

5. A terminal box as called for in claim 4 wherein the boot has a sealed connection with said gasket around said opening.

6. A terminal box as called for in claim 4 wherein said gasket has an annular flange extending downwardly through said opening and the upper end of the boot has a sealed connection with said flange.

7. A terminal box as called for in claim 3 wherein said opening is located generally centrally between the two sides of the box and said terminals are mounted in the box at laterally opposite sides of said boot.

8. A terminal box as called for in claim 3 including a bottom wall on the box, the bottom wall having an opening therein through which conductors are adapted to be extended upwardly and connected with said terminals, said bottom wall opening being generally vertically aligned with the lower open end of said boot.

9. In combination an electrical terminal box having an opening adjacent the upper end thereof, a conduit connected to said box and extending upwardly from said opening, a plurality of terminals mounted in said box on a vertically extending wall thereof and at a level above the bottom of the box, a boot within said box extending downwardly from said opening to a level below said terminals, a plurality of electrical conductors in said conduit extending through said opening and downwardly through said boot, said conductors having a return bend around the lower end of the boot and extending upwardly therefrom for connection with said terminals whereby any moisture which collects on said conductors and any liquid entering the box from said conduit gravitates to the return bent portions of the wires and the lower end of the boot and is thereby prevented from reaching said terminals.

10. The combination called for in claim 9 including a conduit mounting fitting on said box registering with said opening, a gasket interposed between said fitting and the portion of the box surrounding said opening, said boot having a sealed connection with said gasket around the edge of said opening.

11. The combination called for in claim 9 wherein the box has a bottom wall provided with an opening therein through which any water dripping from the lower end of the boot and from the return bent portions of the wires may drain.

References Cited

UNITED STATES PATENTS 3,283,059  11/1966  Plummer _____ 174—60 X

LEWIS H. MYERS, *Primary Examiner.*

D. A. TONE, *Assistant Examiner.*